(12) United States Patent
Wilkey et al.

(10) Patent No.: US 6,567,725 B1
(45) Date of Patent: May 20, 2003

(54) METHOD AND APPARATUS FOR TEACHING ROBOT STATION LOCATION

(75) Inventors: Ann Wilkey, Phoenix, AZ (US); Michael Smigel, Phoenix, AZ (US); Richard J. Stewart, III, Tempe, AZ (US)

(73) Assignee: Speedfam-Ipec Corporation, Chandler, AZ (US)

( * ) Notice: Subject to any disclaimer, the term of this patent is extended or adjusted under 35 U.S.C. 154(b) by 0 days.

(21) Appl. No.: 10/195,619

(22) Filed: Jul. 15, 2002

(51) Int. Cl.[7] .......................... G05B 15/00; G05B 19/00
(52) U.S. Cl. ...................... 700/264; 700/218; 700/245; 318/568.1; 318/568.11; 318/568.12; 318/568.15; 318/568.16; 318/568.21; 318/570; 414/416.03; 414/935; 414/936; 414/937; 414/938; 414/939; 414/940; 901/40; 901/45; 901/47; 701/23
(58) Field of Search ................................. 700/218, 245, 700/264; 318/568.1, 568.12, 568.11, 568.15, 568.16, 568.21, 570, 574, 640; 414/416.03, 744.6, 935–940, 217, 730, 627, 811; 118/500, 728, 729; 901/47, 40, 45; 701/23; 294/64.1, 86.4, 743; 451/10, 41

(56) References Cited

U.S. PATENT DOCUMENTS

| | | | | |
|---|---|---|---|---|
| 4,960,298 A | | 10/1990 | Moroi ........................ 294/64.1 |
| 4,983,093 A | | 1/1991 | Foulke et al. .......... 414/416.08 |
| 5,526,916 A | * | 6/1996 | Amdahl et al. ............. 194/211 |
| 5,600,258 A | * | 2/1997 | Graham et al. ............. 324/758 |
| 5,668,452 A | | 9/1997 | Villarreal et al. ...... 318/568.16 |
| 5,740,062 A | | 4/1998 | Berken et al. .............. 700/218 |
| 5,900,737 A | * | 5/1999 | Graham et al. ............. 324/758 |
| 6,033,521 A | | 3/2000 | Allen et al. ............ 156/345.12 |
| 6,075,334 A | | 6/2000 | Sagues et al. ......... 318/568.11 |
| 6,336,845 B1 | * | 1/2002 | Engdahl et al. ................ 451/41 |
| 6,416,385 B2 | * | 7/2002 | Ferri et al. ..................... 451/10 |
| 6,448,797 B1 | * | 9/2002 | Holt et al. ................... 324/758 |

OTHER PUBLICATIONS

Novak et al., a capacitance–based proximity sensor for whole arm obstacle avoidance, 1992, IEEE, pp. 1307–1314.*

Feddema et al., Whole arm obstacle avoidance for teleoperated robots, 1994, IEEE, pp. 3303–3309.*

Bennamoun et al., Avoidance of unknown obstacles using proximity fields, 1991, IEEE, pp. 435–440.*

* cited by examiner

*Primary Examiner*—William A. Cuchlinski, Jr.
*Assistant Examiner*—McDieunel Marc
(74) *Attorney, Agent, or Firm*—Ingrassia Fisher & Lorenz, P.C.

(57) ABSTRACT

Apparatus for teaching robot station location relative to a work piece apparatus includes an attachment that can be temporarily coupled to the apparatus and positioned in known relationship to the robot station location. A plurality of positional sensors are mounted on the attachment ring, the sensors each configured to produce a signal when a work piece carried by a robot arm is positioned a predetermined distance from the sensor. A signal receiver is configured to receive signals from the sensors and to indicate which of the sensors has produced the signal. The indication may be the activation of an LED display that indicates to an operator what the next movement of the robot arm should be in order to center the work piece with respect to the robot station location.

20 Claims, 7 Drawing Sheets

| ACTIVE SENSORS (LEDs) | NEXT MOVEMENT |
|---|---|
| 61 AND 62 (FIRST) | ADJUST BUTTON 66 (θ+) UNTIL WAFER APPEARS CENTERED BETWEEN 61/62 AND 63/64 OR UNTIL ALL OF 61,62,63 AND 64 ARE ACTIVE |
| 61 AND 62 (SECOND) | ADJUST BUTTON 71 (W+) |
| 61 AND 62 (THIRD) | ADJUST BUTTON 70 (Z) |
| 63 AND 64 (FIRST) | ADJUST BUTTON 67 (θ-) UNTIL WAFER APPEARS CENTERED BETWEEN 61/62 AND 63/64 OR UNTIL ALL OF 61,62,63 AND 64 ARE ACTIVE |
| 63 AND 64 (SECOND) | ADJUST BUTTON 72 (W-) |
| 63 AND 64 (THIRD) | ADJUST BUTTON 70 (Z) |
| 61 AND 64 (FIRST) | ADJUST BUTTON 68 (R-) UNTIL WAFER APPEARS CENTERED BETWEEN 61/64 AND 62/63 OR UNTIL ALL OF 61,62,63 AND 64 ARE ACTIVE |
| 61 AND 64 (SECOND) | ADJUST BUTTON 70 (Z) |
| 61, 62, AND 63 | ADJUST BUTTON 66 (θ+)<br>ADJUST BUTTON 69 (R+) |
| 61, 62, AND 64 | ADJUST BUTTON 66 (θ+)<br>ADJUST BUTTON 68 (R-)<br>ADJUST BUTTON 70 (Z) |
| 62, 63, AND 64 | ADJUST BUTTON 67 (θ-)<br>ADJUST BUTTON 69 (R+) |
| 61, 63, AND 64 | ADJUST BUTTON 67 (θ-)<br>ADJUST BUTTON 68 (R-) |
| 61, 62, 63 AND 64 | ADJUST BUTTON 70 (Z) |

FIG.7

METHOD AND APPARATUS FOR
TEACHING ROBOT STATION LOCATION

FIELD OF THE INVENTION

This invention relates generally to method and apparatus for teaching robot station locations, and in accordance with one embodiment of the invention to method and apparatus for teaching robot station locations for application to a chemical mechanical planarization method and apparatus.

BACKGROUND OF THE INVENTION

Robots are used in many and varied manufacturing applications. One attribute of a mechanical robot that makes the robot useful in such applications is the ability of the robot to carry out a repetitive operation with great precision. For example, a robot is able to repetitively and precisely move objects, held by the arm of the robot, from point A to point B. In order to carry out such movements successfully, however, the robot must first be calibrated, or "taught" the location and orientation of the points A and B.

The process of teaching a robot station location is often done visually by a human operator. The operator controls the robot arm manually to position the end of the arm or a work piece carried by the arm in what is visually perceived to be the correct position. Once so located or positioned, the coordinates and orientation of the robot arm are recorded so that the robot can always return the arm or the work piece to that location and orientation. This method of robot station location, however, is fraught with difficulties. The accuracy of the positioning is subject to the skill and visual acuity of the operator. In addition, in many instances the final desired position is not clearly observable by the operator. For example, in robotically positioning a work piece such as a semiconductor wafer with respect to some chemical mechanical planarization (CMP) equipment, the correct position is at least partially obscured and is not readily observable.

Accordingly, a need exists for a method and apparatus that will allow the teaching of robot station location without reliance on operator visual perception.

BRIEF DESCRIPTION OF THE DRAWINGS

The invention can be understood from the following detailed description taken together with the drawing figures in which:

FIG. 7 illustrates, in table form, robot movements to be made in response to active sensor indications.

DETAILED DESCRIPTION OF THE INVENTION

In accordance with an embodiment of the invention, a method and apparatus are provided for teaching a robot station location that can be carried out in a fully automated mode or in an operator assisted mode. In either mode the teaching can be accomplished without need for an operator making visual observations of the robot location.

Without loss of generality, and for purposes of illustration only, the invention will be described as it applies to a chemical mechanical planarization (CMP) process and specifically as it applies to the CMP processing of a semiconductor wafer in a CMP processing apparatus. It is not intended, however, that the invention be limited to this illustrative embodiment; in fact, the invention is generally applicable to many processes and to the processing of many types of work pieces in many different processing apparatus.

In the processing of a semiconductor wafer to manufacture integrated circuits or other semiconductor devices there are a number of steps in which a layer of insulating material, metal, or other material is formed on at least one surface of the wafer. Following such a formation step, it is often desirable to planarize or otherwise configure the surface of the wafer including such layer of deposited material. One way to configure the surface of the wafer is by chemical mechanical planarization (CMP). Hereinafter any such configuration will be referred to as "planarization." In the CMP process a work piece, held by a work piece carrier head, is pressed against a moving polishing pad in the presence of a polishing slurry. The mechanical abrasion of the surface combined with the chemical interaction of the slurry with the material on the work piece surface ideally produces a surface of a desired shape, usually a planar surface.

Figure 1:
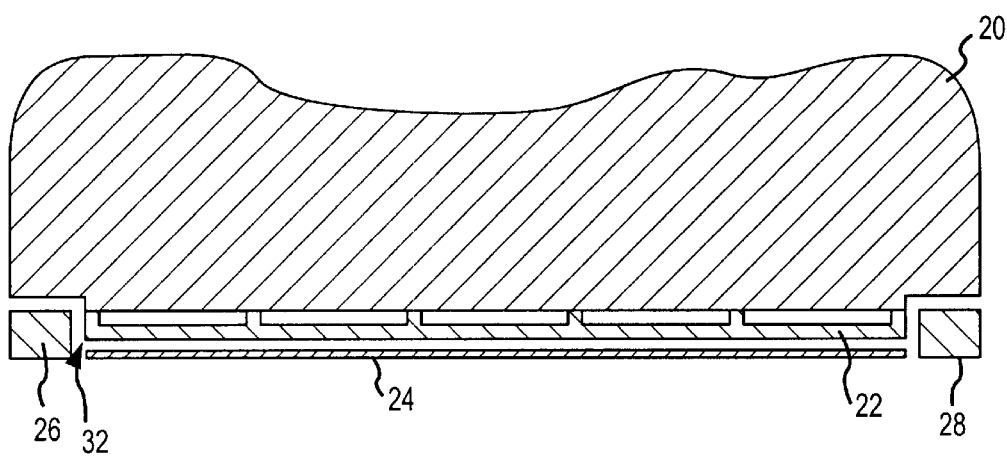
FIG. 1 illustrates, in cross section, a CMP apparatus with which the invention may be used.

The construction of the carrier head of a CMP apparatus and the relative motion between the polishing pad and the carrier head have been extensively engineered in an attempt to achieve a desired rate of removal of material across the surface of the work piece and hence to achieve the desired surface shape. Representative CMP apparatus includes, for example, the Momentum 300 CMP equipment available from SpeedFam-IPEC in Chandler, Ariz. Such equipment is illustrated schematically in cross section in FIG. 1 and includes a carrier head 20 having a flexible membrane 22 that is configured to contact the back or unpolished surface of a work piece 24 and to accommodate variations in that surface. The carrier head also generally includes a flat, toroidal shaped wear ring 26 that surrounds the membrane and the work piece and that pre-stresses or pre-compresses the polishing pad (not illustrated) to protect the leading edge of the work piece. The inner diameter of the toroidal shaped wear ring is only slightly larger than the diameter of the wafer to be planarized. For example, to accommodate a semiconductor wafer having a diameter of 300 millimeters (mm), the wear ring can have a diameter of about 302 mm. The lower surface 28 of wear ring 26 is generally positioned in a plane parallel to and displaced downwardly from the plane of the flexible membrane. So positioned, the wear ring serves to laterally confine the wafer beneath the membrane. The wear ring and the membrane together form a recess 32 on the underside of the carrier head into which the wafer is loaded at the beginning of the planarization operation and from which the wafer is unloaded after the planarization is completed.

Figure 2:
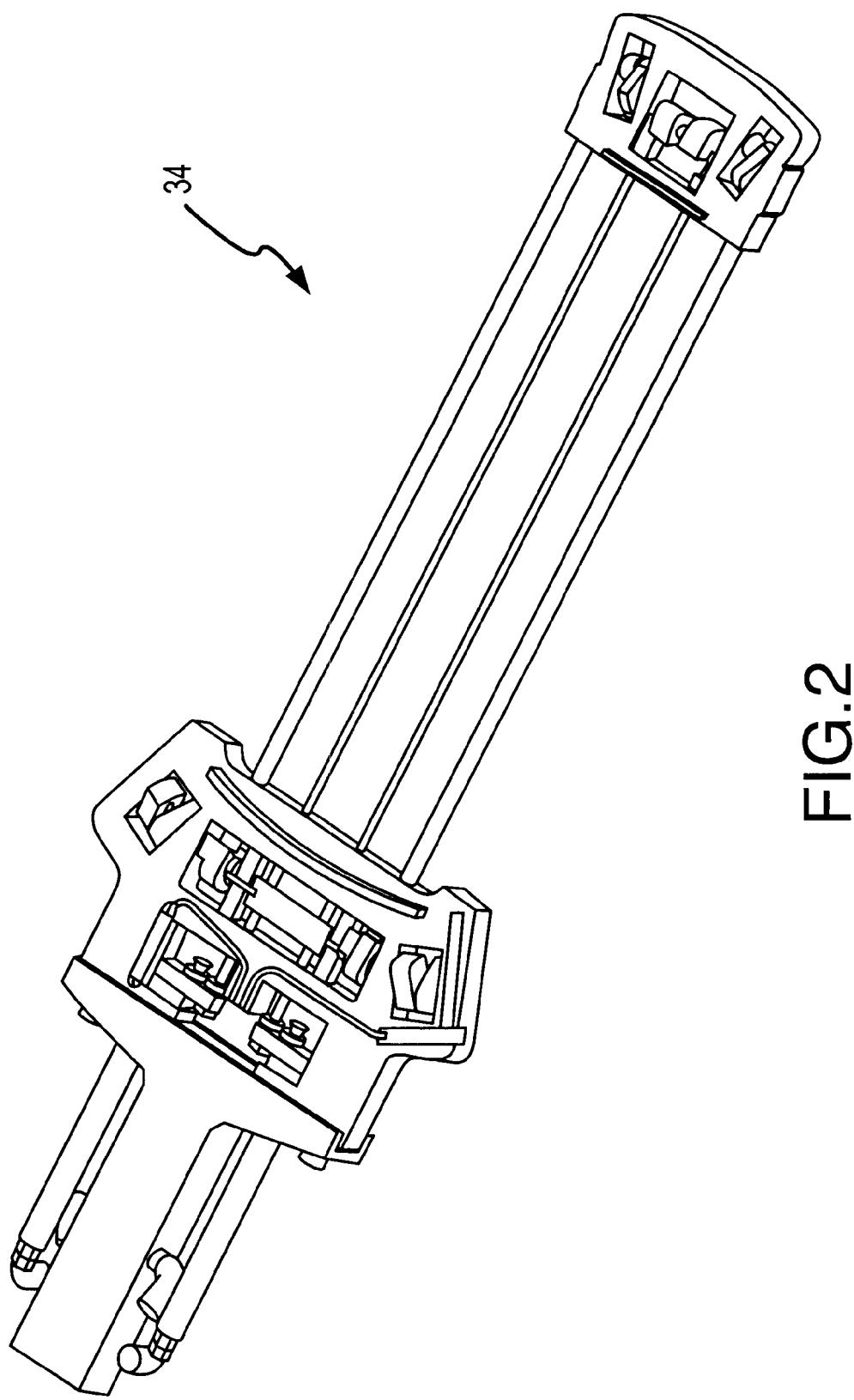
FIG. 2 illustrates, an edge grip end effector.

Semiconductor devices are fragile objects that must be handled delicately to avoid damaging the device surface. Accordingly, it is usual to handle semiconductor wafers, for example during loading into and unloading from the recess in the underside of the CMP apparatus, by grasping the wafers by a device 34, illustrated in FIG. 2, that touches only the extreme outer edge of a wafer. The grasping device, in turn, is mounted on the end 36 of a robot arm 38 (only a portion of which is illustrated) and is usually referred to as an edge grip end effector. The wafer grasped by the end effector is moved from one station, which may be, for example, a wafer storage cache or another process apparatus, to the CMP apparatus by the action of the robot arm. At the CMP apparatus the wafer should be positioned in a plane that is a predetermined distance from a reference surface such as the surface of the flexible membrane. As explained below, it may be desirable that the plane be canted at a predetermined angle with respect to the reference plane. Because the recess into which the wafer must be loaded is only slightly larger in diameter than the wafer itself, the robot must be precisely calibrated and the location and orientation of the robot station location must be accurately known. Manually calibrating the robot is difficult, particularly in the illustrated example, because the final positioning of the wafer is difficult to observe. The wafer itself tends to obscure the view of the operator as the wafer approaches the correct position.

Figure 3:
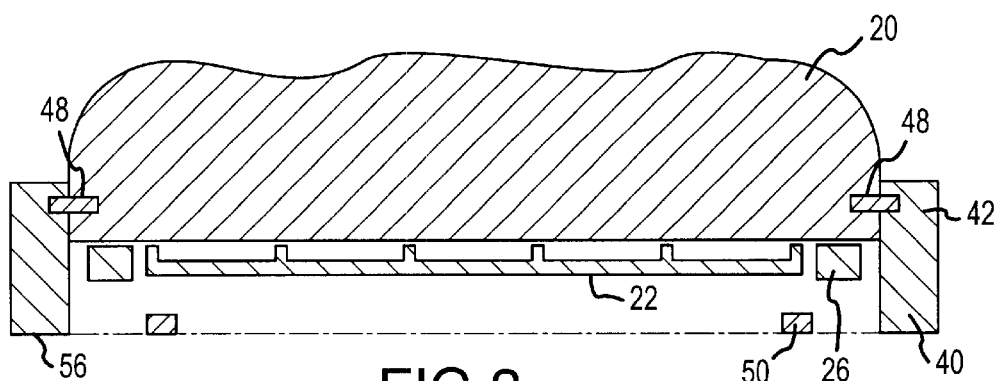
FIGS. 3 and 4 illustrate, in cross section and bottom views, respectively, apparatus for teaching robot station location in accordance with one embodiment of the invention.
Figure 4:
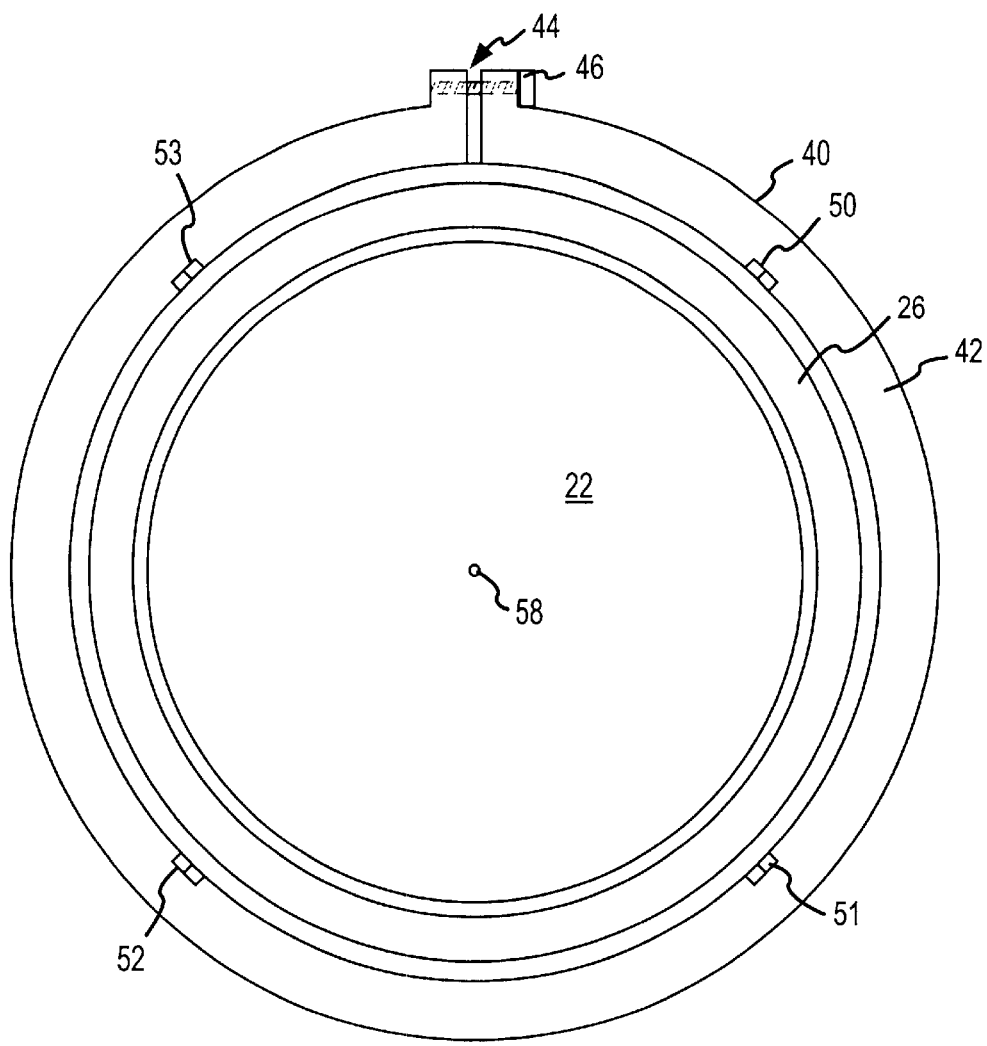

FIGS. 3 and 4 illustrate, in cross section and bottom view, respectively, apparatus 40 for teaching robot station location in accordance with one embodiment of the invention. Apparatus 40 includes an attachment ring 42 that can be coupled to carrier head 20 in a known and repeatable position. In accordance with one embodiment, the ring can be coupled to the carrier head by a compression fit. The carrier head is generally made of stainless steel or other rigid material. The attachment ring can be made from, for example, a suitable polymer such as Polyethylene Terephthalate, or "PET", sold under the name "Ertalyte". The ring material preferably exhibits good dimensional stability when subject to conditions present in a semiconductor processing environment. The compression fit can be effected, for example, by slotting the ring at location 44 and drawing the slotted ring into a tight fit against the side of the carrier head by a threaded attachment screw and turn knob 46. The repeatable location of the attachment ring on the carrier head can be achieved by alignment dowels 48 that align corresponding holes in the ring and the carrier head. Other attachment and alignment mechanisms such as mating alignment marks will be readily apparent to those skilled in the art.

In accordance with one embodiment of the invention, a plurality of proximity sensors 50, 51, 52, and 53 are positioned near the lower surface 56 of the attachment ring. In the illustrated embodiment, four sensors are equally spaced about the inner periphery of the attachment ring, although more or fewer sensors could be employed. Although illustrated to be equally spaced, the sensors could be spaced at unequal intervals if necessary for a particular application. The sensors are preferably positioned about the circumference of a circle centered at the center 58 of flexible work piece membrane 22. The sensors can be ultrasonic sensors, capacitive sensors, optical sensors, inductive sensors, or the like that are capable of sensing the presence of a work piece that is brought into proximity with the sensor and of producing a signal in response to that sensing. Preferably the sensors are binary response sensors for which the sensitivity of the sensors can be adjusted. That is, the sensors produce a "zero" signal until a work piece is sensed and thereafter produce a "one" signal. The spacing of a work piece to the sensor at which the signal transitions from the zero state to the one state should be adjustable by adjusting the sensitivity of the sensor.

Figure 5:
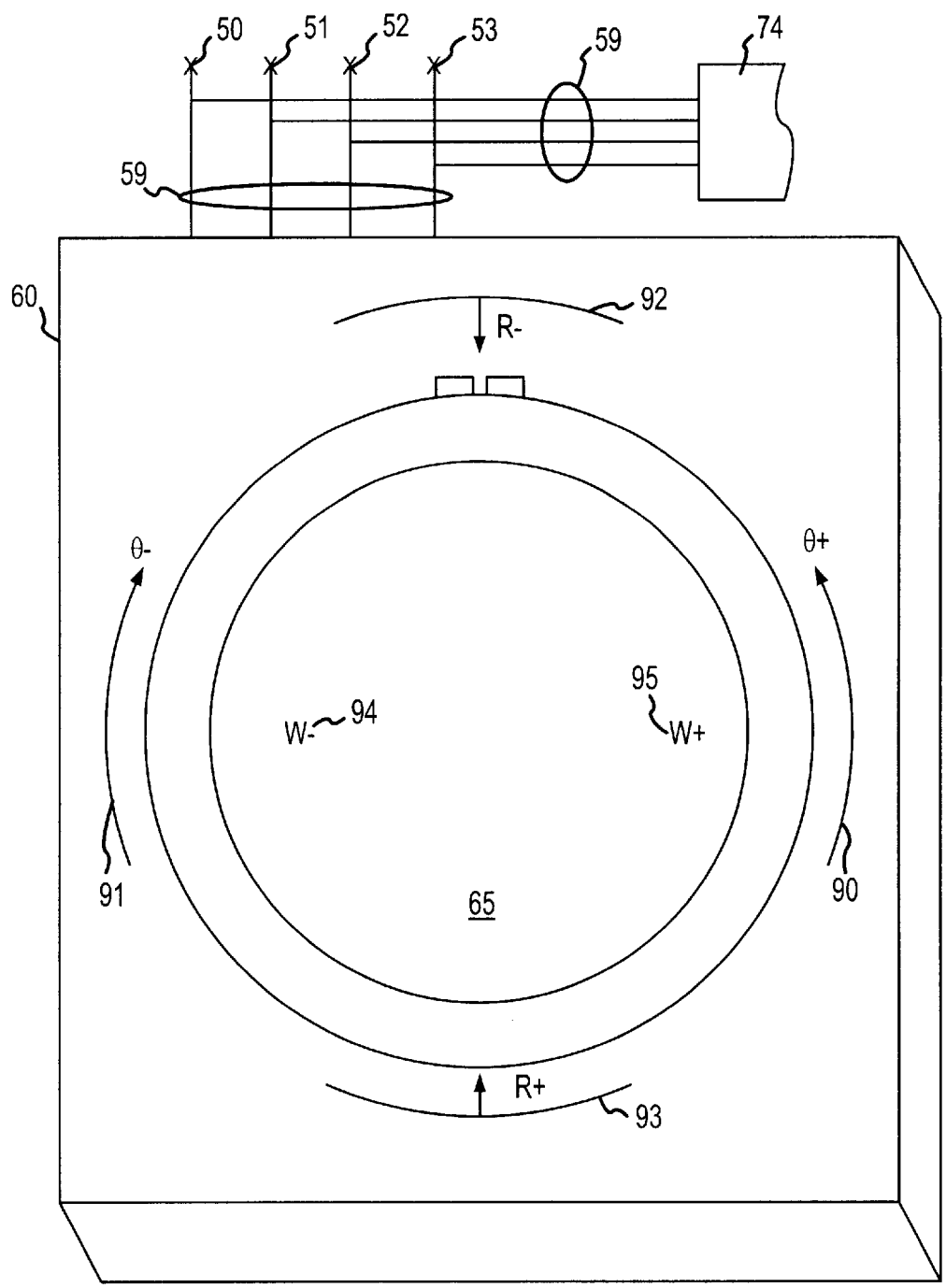
FIG. 5 schematically illustrates a sensor box in accordance with one embodiment of the invention.

In accordance with one embodiment of the invention, signal lines 59 conveying signals from the plurality of sensors are routed to a sensor box 60 as schematically illustrated in FIG. 5. The sensor box is used in a manual, operator assisted robot station location teaching to be more fully explained below. In accordance with one embodiment, sensor box 60 supplies the input requirements for the sensors, including power supplies for the sensors and potentiometers, adjustable amplifiers or the like for the calibration of the sensitivity of the sensors. The sensor box also receives the binary outputs from the sensors and converts those outputs to a visual display, preferably a display of light emitting diodes (LEDs) 61, 62, 63, and 64 or the like. In accordance with one embodiment of the invention, the LEDs are embedded into a process template 65 as illustrated that provides readily understandable information or feedback to the operator on which way the robot arm should be positioned in order to align the wafer with the sensors and hence with the recess in the bottom of the carrier head. Preferably LEDs 61–64 are embedded in positions on the template that mimic the position of sensors 50–53 on the attachment ring, respectively. Thus, for example, the operator knows that if LED 61 is active, the wafer is within proximity range of sensor 50. The sensor box can also include a plurality of indicia such as those illustrated at 90–95 that provide further information to the operator concerning necessary adjustments to the robot arm positioning as will be explained more fully below.

In accordance with a further embodiment of the invention, instead of coupling the signal lines to the visual display, the signal lines are routed to the I/O 74 of the robot. The I/O includes a receiver coupled to receive signals transmitted on the signal lines. The signals from the sensors are monitored and utilized by a robot controller that can be, for example, a processor (not illustrated) within or coupled to the robot to perform automatic teaching of robot station locations. Based on the sensor signals, the robot controller controls and adjusts the robot arm in an optimum manner to align the wafer with the sensors and the carrier head.

Figure 8:
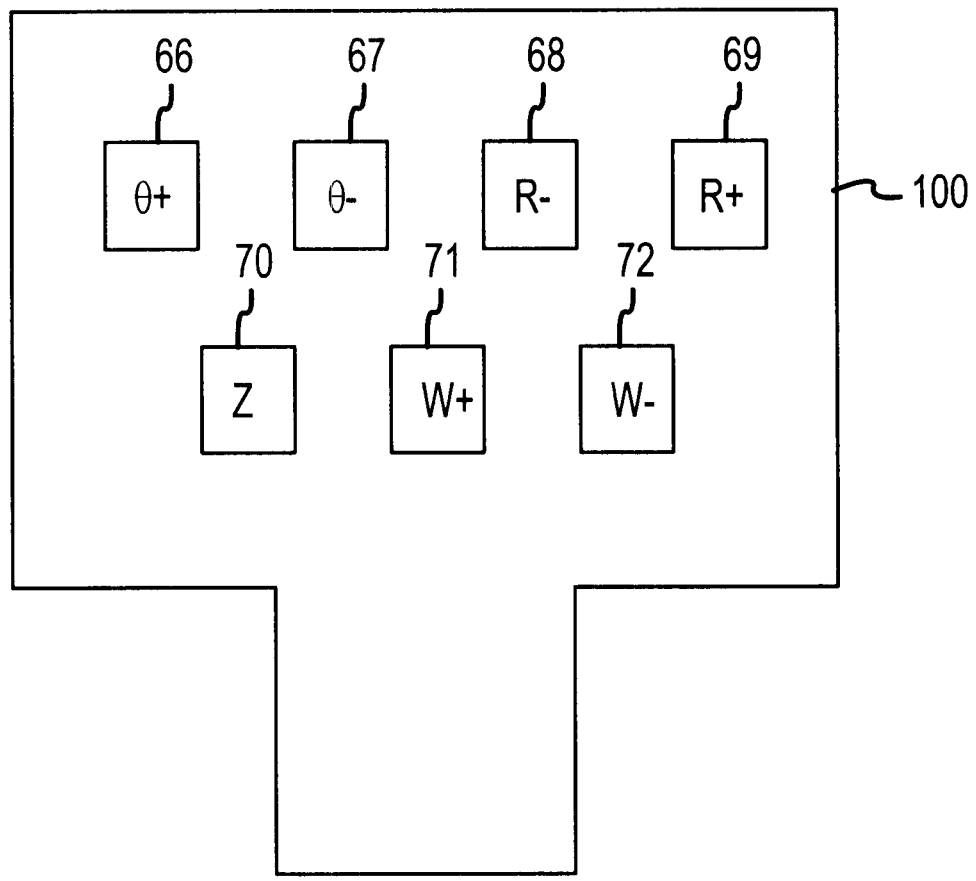
FIG. 8 illustrates a manual robot controller.

Manual control of robot arm positioning is controlled by a plurality of push buttons 66–72 on a robot controller 100 as illustrated in FIG. 8. Such a controller, which is electrically coupled to the robot (coupling not illustrated), is supplied by the robot manufacturer. Other forms of robot controller such as a joystick or the like may be used, depending on the robot manufacturer. An operator can manipulate buttons 66–72 to adjust the position of the robot arm and hence the position of the wafer relative to the recess in the CMP carrier head. Such manipulation is carried out by the operator in response to observation of the display of LEDs.

Figure 6:
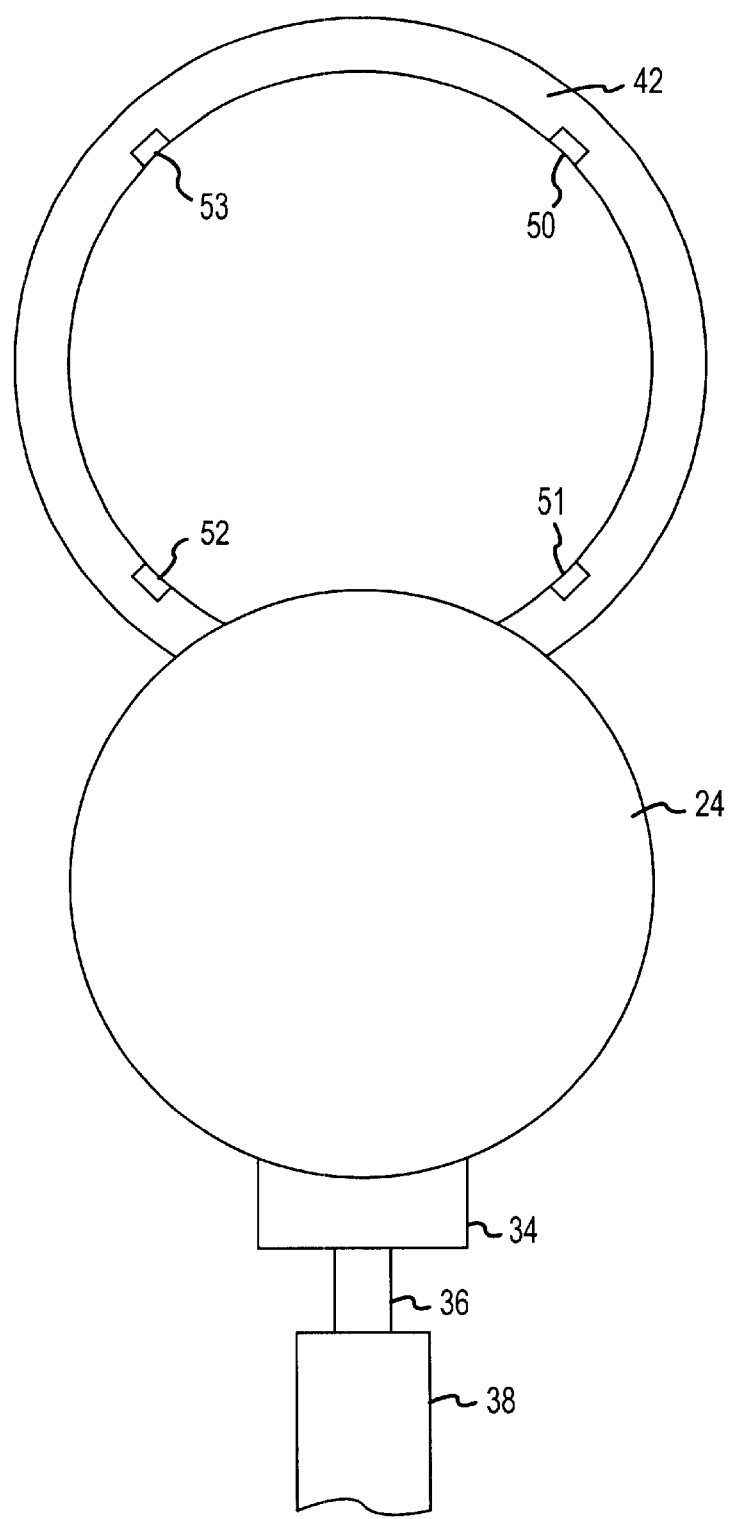
FIG. 6 illustrates, in a bottom view, positioning of a work piece relative to an attachment ring with its array of sensors.

Correct operator assisted positioning of the wafer relative to the recess in the carrier head, in accordance with one embodiment of the invention, is accomplished as follows. A wafer is grasped by an edge grip end effector that, in turn, is mounted on the end of a robot arm. The robot arm may be a part of a robot such as an Asyst Axys CMP Robot available from Asyst Technologies in Sunnyvale, Calif. This robot has four degrees of freedom: R, θ, Z, and wrist (W), where R and θ are radial coordinates, Z is the vertical coordinate, and W is a rotational coordinate about a wrist axis, and the wafer is positioned by adjusting those four degrees of freedom. The operator controls the robot and robot arm 38 to move wafer 24 toward the desired location beneath the carrier head and attachment ring 42 with its array of proximity sensors 50–53 as illustrated schematically in FIG. 6. In accordance with an embodiment of the invention, and with reference again to FIGS. 5 and 8, the operator has access to seven buttons 66–72 on robot controller 100 that control the robot arm position. The buttons have the following functions: button 66 controls motion in a positive θ direction (θ+); button 67 controls motion in a negative θ direction (θ−); button 68 controls motion in a negative R direction (R−); button 69 controls motion in a positive R direction (R+); button 70 controls motion in the Z direction (Z); button 71 controls motion in the positive W direction (W+), and button 72 controls motion in the negative W direction (W−). As the wafer is moved toward the desired location and a first response is received from the sensors, as indicated by the lighting of two or more of the LEDs on sensor box 60, the operator can make adjustments in the robot arm position by pressing one or more of buttons 66–72. Because of the positioning of the LEDs in logical positions on the sensor box (together with the indicia 90–95), an intuitive feel is conveyed to the operator concerning the wafer location relative to the sensors and the recess in the carrier head. The operator can adjust the robot arm position in response to the LED display by pressing the buttons in the manner and order indicated in table 80 found in FIG. 7. The table in FIG. 7 indicates, in the right hand column, the next optimum movement to be made in response to the active sensors (or the corresponding active LEDs) observed in the left hand column. Where there is more than one entry in the table, the preferred approach is to execute the entries in the order indicated. For example, if the operator observes that LEDs 61 and 62 are active, the operator first adjusts θ in the positive direction, then adjusts the wrist in the positive direction, and then adjusts the vertical height or Z direction. The inventors have observed that some sensors exhibit a hysteresis effect. In working with such sensors it may be advantageous to carry out each of the steps listed in the table individually with an additional step of backing away from the carrier head between each step. After each of the steps is completed and the wafer is properly positioned beneath the attachment ring, the coordinates or the robot arm are recorded. This records a first robot station location. Because of the height of the attachment ring and the sensitivity adjustment that has been made in each of the sensors, this first robot station location is a known distance below the actual working robot station location. That is, the first robot station location is a known translated distance away from the actual working robot station location. Appropriate correction is made to the first robot station location to account for this translation so that, in actual operation, the robot arm moves the wafer to the correct position relative to the recess in the CMP carrier head so that the wafer can be correctly and accurately loaded into that recess.

In accordance with a further embodiment of the invention, the process of teaching robot station location is accomplished in a completely automated manner without any operator intervention. As described above, the signal lines from the sensors can be routed to an I/O port 74 on the robot where the signals from the sensors are monitored and utilized by a robot controller or processor to perform automatic robot station location teaching. The teaching is accomplished by a software program that programs the processor to execute automatically, in response to the signals received from the sensors, the same "next movement" operations as would be executed manually by an operator and as illustrated in the table of FIG. 7. Such programming can be done, for example, by those of skill in the art of programming robot operations by converting the table of FIG. 7 into a flow chart. As above, once the robot arm has been correctly positioned, the coordinates of that position can be recorded and then appropriately corrected for the translated distance below the recess in the carrier head.

As described above, the first robot station location may be translated from the working robot station location. In addition, in accordance with one embodiment of the invention, the first station location may not necessarily be parallel to the flexible membrane of the CMP carrier head. It may be advantageous, for example as a part of the operation of loading or unloading a wafer from the carrier head, to have the wafer presented to the carrier canted at a predetermined angle with respect to the flexible membrane. Such an orientation of the wafer can be incorporated into the robot station location training by adjusting the sensitivity of one or more of the plurality of sensors mounted on the attachment ring. Prior to initiation of a robot station location teaching, the robot arm, with an attached wafer, is placed in a calibration position underneath the attachment ring. The amplifiers for each of the sensors are adjusted so that all of the sensors simultaneously detect the presence of the wafer in a cant-neutral state. One or more of the amplifiers can then be adjusted, to adjust the sensitivity (or range) of the corresponding one or more sensors, to incorporate the desired cant angle into the station location calibration.

After the first robot station location has been taught, the same process can be repeated for additional robot station locations. The other locations can be, for example, other CMP carrier heads in a multiple head CMP apparatus. In addition, following such station location teaching, the attachment ring can be parked at a calibration location and the robot station location for the calibration location can be determined. The calibration location can be used to occasionally recheck the robot station location calibration. Such calibration may change, for example, when the edge grip end effector is changed, if the coupling between the end effector and the robot arm changes, with normal wear of mechanical parts, or the like.

Tests run using the operator assisted robot station location teaching in accordance with the invention indicate such teaching is more accurate and less time consuming than robot station location teaching by the prior art visual, manual technique. Thus it is apparent that there has been provided, in accordance with the invention, apparatus and method for robot station location teaching that fully meets the needs set forth above. Although the invention has been described and illustrated with reference to a specific application, the invention is not limited to that illustrative application or the particular illustrative robot. Instead, the invention is applicable to robot station location teaching in any application in which robots are employed and to any robot used in that application. It is thus intended to include within the invention all such applications as fall within the scope of the appended claims.

What is claimed is:

1. A method for teaching robot station location comprising the steps of:

providing a work piece apparatus having a station location;

positioning a robot in proximity to the work piece apparatus, the robot having a moveable arm;

coupling a work piece to an end of the moveable arm, the work piece intended for alignment with the station location of the work piece apparatus;

providing a plurality of proximity sensors in alignment with the station location of the work piece apparatus, each of the plurality of proximity sensors configured to produce a signal in response to the work piece being positioned a predetermined distance from the proximity sensor;

operating the robot to move the moveable arm and the work piece coupled thereto to position the work piece close enough to the station location of the work piece apparatus to cause at least one of the plurality of proximity sensors to produce a signal;

determining which of the plurality of proximity sensors has produced a signal;

further operating the robot, in response to the step of determining which of the plurality of proximity sensors has produced a signal, to move the moveable arm and the work piece coupled thereto to move the work piece to a position to cause at least one additional one of the plurality of proximity sensors to produce a signal;

continuing to determine which of the plurality of proximity sensors has produced a signal; and still further operating the robot in response to the step of continuing to determine to move the work piece to a position relative to the station location of the work piece apparatus to cause each of the plurality of proximity sensors to simultaneously produce a signal indicating the work piece is a predetermined distance from each of the plurality of proximity sensors.

2. The method of claim 1 wherein the step of providing a work piece apparatus comprises the step of providing a chemical mechanical planarization apparatus.

3. The method of claim 2 wherein the step of providing a chemical mechanical planarization apparatus comprises the step of providing a chemical mechanical planarization apparatus having a work piece carrier comprising a work piece diaphragm and a wear ring surrounding the work piece diaphragm.

4. The method of claim 3 wherein the step of providing a plurality of proximity sensors comprises the step of attaching a sensor support to the work piece carrier to position the plurality of proximity sensors about the circumference of a circle centered on the work piece diaphragm and in a plane parallel to the wear ring.

5. The method of claim 3 further comprising the step of removing the sensor support from the work piece carrier and attaching the sensor support at a location remote from the work piece carrier, the remote location comprising a second robot station location.

6. The method of claim 1 wherein the step of determining which of the plurality of proximity sensors has produced a signal comprises optically monitoring a display in which an indicator is coupled to each of the plurality of proximity sensors and the indicator changes in response to receipt of a signal.

7. The method of claim 6 wherein the step of further operating the robot comprises the step of manually controlling the robot in response to the step of optically monitoring a display.

8. The method of claim 1 wherein the step of determining which of the plurality of proximity sensors has produced a signal comprises the steps of:

providing a robot controller coupled to the robot;

providing a receiver coupled to receive signals from the sensors, wherein the receiver is coupled to the robot controller; and receiving the signals at the receiver.

9. The method of claim 8 wherein the step of further operating the robot comprises the step of activating the robot controller in accordance with a software routine and in response to the signals received at the receiver.

10. Apparatus for teaching robot station location relative to a work piece apparatus comprising:

a work piece apparatus;

a robot station location relative to the work piece apparatus;

an attachment coupled to the work piece apparatus and positioned in known relationship to the robot station location;

a plurality of positional sensors mounted on the attachment, each of the plurality of positional sensors configured to produce a signal in response to a work piece carried by a robot arm being positioned a predetermined distance from the positional sensor; and a signal receiver configured to indicate which of the plurality of positional sensors has produced a signal.

11. The apparatus of claim 10 wherein the signal receiver comprises an optical display.

12. The apparatus of claim 10 further comprising:

a robot having a robot arm positioned in proximity to the work piece apparatus; and wherein the signal receiver comprises a feedback mechanism coupled to the robot and configured to move the robot arm in response to the signal received.

13. The apparatus of claim 12 wherein the signal receiver further comprises a software program capable of determining optimum movement of the robot arm in response to the signal received.

14. The apparatus of claim 10 wherein the attachment comprises a removable attachment configured for attachment to the work piece apparatus during a robot station location teaching and removal following the teaching.

15. The apparatus of claim 14 wherein the attachment comprises a removable attachment configured for positioning at a location remote from the work piece apparatus following the calibration and wherein the location remote from the work piece apparatus comprises a second robot station location.

16. The apparatus of claim 10 wherein the plurality of positional sensors comprise sensors selected from the group consisting of optical sensors, ultrasonic sensors, capacitive sensors, and inductive sensors.

17. The apparatus of claim 10 wherein the plurality of positional sensors comprise binary response sensors.

18. The apparatus of claim 10 wherein the plurality of positional sensors comprise four sensors positioned on the circumference of a circle centered on the robot station location.

19. The apparatus of claim 10 wherein the work piece apparatus comprises a chemical mechanical planarization apparatus.

20. The apparatus of claim 19 wherein the plurality of positional sensors are calibrated to produce a signal in response to a work piece being positioned in a plane a predetermined distance from a reference surface on the chemical mechanical planarization apparatus, the predetermined plane canted with respect to the reference surface.

* * * * *